(12) United States Patent
Legen et al.

(10) Patent No.: US 10,127,839 B2
(45) Date of Patent: Nov. 13, 2018

(54) APPARATUS FOR SIMULATING THE FUNCTION OF HUMAN STOMACH AND/OR HUMAN INTESTINE

(71) Applicant: Sandoz AG, Basel (CH)

(72) Inventors: Igor Legen, Ljubljana (SI); Alenka Bevc, Ljubljana (SI); Sandra Berglez, Ljubljana (SI); Janez Diaci, Ljubljana (SI); Lovro Kuscer, Ljubljana (SI)

( * ) Notice: Subject to any disclaimer, the term of this patent is extended or adjusted under 35 U.S.C. 154(b) by 199 days.

(21) Appl. No.: 15/107,951

(22) PCT Filed: Dec. 11, 2014

(86) PCT No.: PCT/EP2014/077436
§ 371 (c)(1),
(2) Date: Jun. 24, 2016

(87) PCT Pub. No.: WO2015/086769
PCT Pub. Date: Jun. 18, 2015

(65) Prior Publication Data
US 2016/0351079 A1    Dec. 1, 2016

(30) Foreign Application Priority Data
Dec. 12, 2013    (EP) .................................... 13196935

(51) Int. Cl.
*G09B 23/28*    (2006.01)
*G09B 23/32*    (2006.01)
(Continued)

(52) U.S. Cl.
CPC .............. *G09B 23/32* (2013.01); *F04B 43/12* (2013.01); *G09B 23/303* (2013.01)

(58) Field of Classification Search
USPC ................................. 434/262, 267, 268, 272
See application file for complete search history.

(56) References Cited

U.S. PATENT DOCUMENTS

| 4,459,113 A | * | 7/1984 | Boscaro Gatti | ...... | G09B 23/285 |
| | | | | | 434/272 |
| 4,907,973 A | * | 3/1990 | Hon | ..................... | G09B 23/285 |
| | | | | | 434/262 |

(Continued)

FOREIGN PATENT DOCUMENTS

EP    2284821 A1    2/2011
WO    2011069472 A1    6/2011

OTHER PUBLICATIONS

CN201465395, May 12, 2010 [Google Patents document retrieved online Feb. 23, 2018].*

(Continued)

*Primary Examiner* — Kurt Fernstrom
(74) *Attorney, Agent, or Firm* — Luedeka Neely Group, P.C.

(57) ABSTRACT

Provided is an apparatus for simulating the function of a human stomach and/or intestine. The apparatus comprises a flexible vessel (10; 100), and a plurality of constriction mechanisms (20), wherein each of the constriction mechanisms (20) is disposed annularly around the outer circumference of the vessel (10; 100), and an inner diameter of each of the constriction mechanisms (20) is variable such that the vessel (10; 100) can be locally and annularly constricted.

14 Claims, 15 Drawing Sheets

(51) Int. Cl.
*F04B 43/12* (2006.01)
*G09B 23/30* (2006.01)

(56) References Cited

U.S. PATENT DOCUMENTS

| | | | | |
|---|---|---|---|---|
| 4,938,696 | A * | 7/1990 | Foster | G09B 23/30 |
| | | | | 434/267 |
| 5,040,955 | A | 8/1991 | Knutson | |
| 5,518,406 | A * | 5/1996 | Waters | G09B 23/285 |
| | | | | 434/267 |
| 7,255,564 | B2 * | 8/2007 | Isaacs | G09B 23/30 |
| | | | | 40/524 |
| 7,397,166 | B1 | 7/2008 | Morgan et al. | |
| 8,257,085 | B2 * | 9/2012 | Alric | G09B 23/36 |
| | | | | 434/127 |
| 2006/0264983 | A1 | 11/2006 | Holsten et al. | |
| 2008/0206728 | A1 * | 8/2008 | Wickham | B01F 5/0685 |
| | | | | 434/272 |
| 2008/0299529 | A1 * | 12/2008 | Schaller | G09B 23/285 |
| | | | | 434/267 |
| 2009/0246747 | A1 * | 10/2009 | Buckman, Jr. | G09B 23/285 |
| | | | | 434/272 |
| 2012/0045743 | A1 * | 2/2012 | Okano | G09B 23/30 |
| | | | | 434/272 |
| 2012/0164616 | A1 * | 6/2012 | Endo | A61B 1/00057 |
| | | | | 434/267 |

OTHER PUBLICATIONS

CN201465395 Figure, May 12, 2010 [retrieved from EAST Feb. 23, 2018].*
International Search Report and Written Opinion of the International Searching Authority for PCT/EP2014/077436, dated Feb. 13, 2015, 11 pages.
Database WPI, Week 2010037, Thomson Scientific, XP002723729, London, United Kingdom.

* cited by examiner

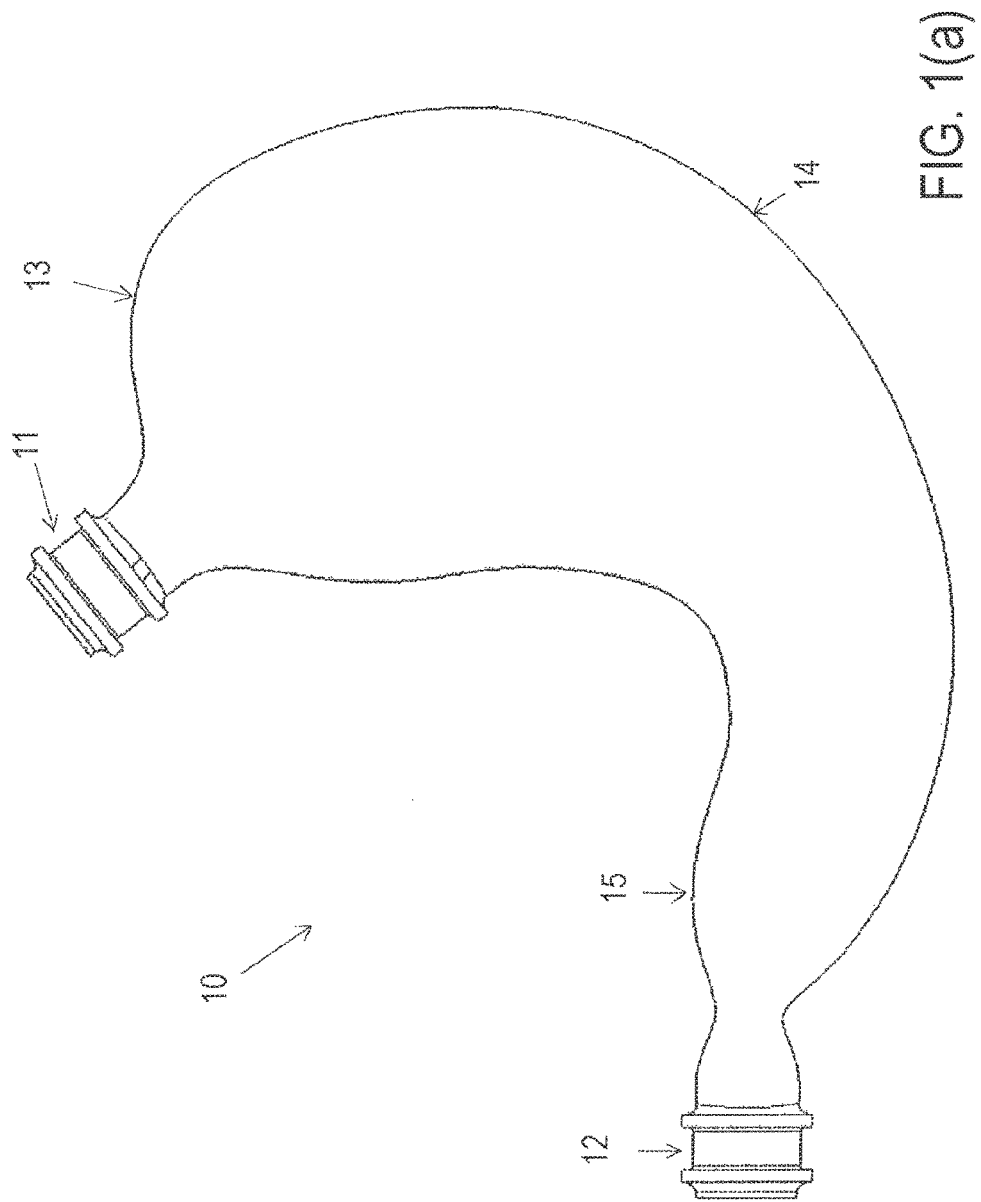

APPARATUS FOR SIMULATING THE FUNCTION OF HUMAN STOMACH AND/OR HUMAN INTESTINE

This application is a Section 371 national phase entry of PCT application PCT/EP2014/077436, filed Dec. 11, 2014. This application also claims the benefit of the earlier filing date of European patent application 13196935.4, filed Dec. 12, 2013.

The present invention relates to an apparatus for simulating the function of human stomach and/or human intestine (e.g. small intestine and/or large intestine).

In the pharmaceutical development one of the major challenges is to develop a method that can predict clinical efficacy of pharmaceutical formulations/drugs in humans. The clinical efficacy of a drug is dependent on the time concentration profile of the drug on the site of action, which is dependent on the time concentration profile of the drug in the blood, which is dependent on the absorption profile of the drug from the gastrointestinal tract. The major route for drug application is oral, and the formulation is first exposed to conditions in the stomach. The stomach is extremely important for the drug absorption; because the conditions in the stomach dictate the passage of the formulation or released drug into the small intestine, which is the major site for drug absorption. For example: the most frequent formulation to enable prolonged release of a drug is a matrix tablet. The release of the drug from matrix tablets is strongly dependent on the friction between the formulation and stomach wall and on the mechanical pressure applied to the formulation. Accordingly, there is a need for a realistic in-vitro simulation of the digestion process of pharmaceutical formulations in the human stomach and the intestine, respectively.

Additionally, in the medicine, particularly in the field of gastroenterology, endoscopy, as an important diagnostic and treatment tool, is traditionally learned by supervised, hand-on training in a clinical setting. This can result in an increased procedure duration, in dependence on a willing of a patient, and in potential increased patient discomfort and risk. These drawbacks can be minimized by using endoscopic simulators. However, common endoscopic simulators are presently not able to realistically simulate the movement of the human stomach and intestine, so that the simulator training alone is not sufficient to provide clinical competence.

Additionally, high-risk lifestyle and dietary patterns have been proposed to account for more than 80% of all coronary events in Western nations. The glycemic index (GI) was developed to characterize the rate of digestion of a carbohydrate food compared with a reference carbohydrate food. It has been demonstrated in clinical trials that reducing the GI can improve coronary heart disease risk factors including body mass index (BMI), blood pressure, and serum cholesterol. Carbohydrates in the food can be present in different physical form (different structure and physical properties) and can have different particle size, and both factors influence the GI of the food. For example, in processed food particle size of the food is decreased, which will increase enzymatic availability of carbohydrates and consequently elicits a higher post-consumption glucose response and faster gastric emptying compared to their non-processed counterparts. The stomach (and the intestine) is very important in the digestion process, due to chemical degradation and mechanical destruction of food. Therefore, in the food industry, it is very important to know what is the fate of the food in the stomach and the intestine (i.e. to how small particles the food is degraded) to find the balance between health values of the food and consumption habits of the consumers. Digestion of food in the stomach and intestine, respectively, can be simulated in devices that simulate function of the human stomach and the human intestine, respectively. However, such devices are presently not able to realistically simulate the function of the human stomach and the human intestine, respectively.

Accordingly, there is a need for an apparatus to be able to realistically simulate the function of the human stomach and/or intestine.

Therefore, it is the object of the invention to provide an apparatus which is able to realistically simulate the function of human stomach and/or intestine.

The object of the invention is achieved with an apparatus for simulating the function of a human stomach and/or human intestine according to the below items.

Item 1: Apparatus for simulating the function of a human stomach and/or intestine (preferably small intestine and/or large intestine), comprising
 a flexible vessel, and
 a plurality of constriction mechanisms, wherein each of the constriction mechanisms is disposed annularly around the outer
 circumference of the vessel, and an inner diameter of each of the constriction mechanisms is variable such that the vessel
 can be locally and annularly constricted.

With this configuration of the apparatus, since each of the constriction mechanisms is disposed annularly around the outer circumference of the vessel (encloses the outer circumference of the vessel) simulating the human stomach wall and/or the human intestine wall, with an inner diameter of each of the constriction mechanisms being variable (specifically: can be temporarily reduced) such that the vessel can be locally and annularly constricted (i.e. a local wall constriction takes place), the dynamics and, in particular, the peristaltic movement (propulsive as well as non-propulsive peristalsis) of a human stomach and/or intestine can be realistically mimicked.

Thus, as one advantage, it is possible to realistically simulate the motion of gastric ingredients (e.g. drugs, food, etc.) including mixing, grinding (milling) and gastric emptying. Therefore, the digestion process of pharmaceutical formulations/drugs in the human stomach and/or the human intestine can be realistically simulated so that the efficacy thereof can be predicted with high precision. Also, the digestion process of food (e.g. how the food is degraded) can be realistically simulated.

As another advantage, the apparatus can be used as an endoscopic simulator which, due to the simulation of the peristaltic movement, provides a very realistic training environment, thereby reducing the necessity of supervised, hand-on training in a clinical setting.

In this respect, it is noted that the vessel can be configured so as to simulate either the human stomach or the human intestine (e.g. small intestine and/or large intestine), or the vessel can be configured to simulate both the human stomach and the human intestine (e.g. small intestine and/or large intestine). To this end, the vessel can be made of one piece, or can be made of plural pieces, with e.g. one piece representing the human stomach and with another piece(s) representing the human intestine.

Item 2: Apparatus according to item 1, wherein the vessel has mechanical properties similar to those of human stomach and/or intestine tissue. That is, the vessel is soft and flexible, will retain its shape, when filled with fluid, and will relax but not shrink significantly, when empty. Thus, the mechanical properties of the vessel are very similar to those a human stomach/intestine.

Item 3: Apparatus according to item 1 or 2, wherein the vessel is made of a soft and flexible material, preferably of a polymer. With the use of such a material, the mechanical properties according to item 2 can be achieved. Preferably, the vessel is made of a (platinum cure) silicone rubber (e.g. Ecoflex® Supersoft Silicone, Dragon Skin® High Performance Silicone Rubber, etc.), and more preferably, the vessel is made of a plurality of silicone rubber layers, wherein the layers can be made of different materials or different material composition. This allows a good simulation of the human stomach and/or the human intestine. The vessel can also be made of a different material such as e.g. urethane rubber, of a combination of materials, etc. Further, in case the vessel is intended to simulate both the stomach and the intestine, a portion of the vessel simulating the stomach can be made of a different material/material composition than a portion of the vessel simulating the intestine. In addition, the material is preferably selected such that the vessel exhibits the required chemical inertness with respect to acidic gastric fluid. This can also be realized by a specific coating onto the vessel wall. Preferably the thickness of the vessel is in the range of approximately 0.5 to 2 mm in case of a vessel used in the apparatus for simulating the function of human stomach, and in the range of approximately 0.5 to 3 mm in case of a vessel used in the apparatus for simulating the function of human intestine.

Item 4: Apparatus according to any one of items 1 to 3, wherein a longitudinal direction of the vessel describes a curve. Since the longitudinal (extension) direction of the vessel describes a curve, i.e. because the vessel is bent, the shape of the vessel is more similar to a human stomach/intestine than a vessel which is not bent.

Item 5: Apparatus according to any one of items 1 to 4, wherein the vessel has a shape (and/or size) similar to that of a human (adult) stomach, and/or has a shape (and/or size) similar to that of human (adult) small intestine, and/or has a shape (and/or size) similar to that of human (adult) large intestine. Since the shape (and/or size) of the vessel is similar to the human stomach, small intestine and/or large intestine, the behaviour/function thereof can be simulated more precisely. As mentioned above, the vessel can be configured to simulate either the stomach or the intestine (small and/or large intestine) so that the vessel has the shape (and/or size) of either the stomach or the intestine, or can be configured to simulate both the stomach and the intestine (small and/or large intestine) so that the vessel has the shape (and/or size) of both the stomach and the intestine. The shape of the vessel is not restricted to the above shapes and can e.g. have a tubular shape.

In case the vessel has a shape similar to that of a human stomach, it preferably has sections similar in shape (and/or size) to a fundus, a corpus (or body), and a pyloric antrum, respectively. In case the vessel has a shape similar to that of a human small intestine, it preferably has sections similar in shape (and/or size) to a duodenum, jejunum and ileum, respectively. In case the vessel has a shape (and/or size) similar to that of a human (adult) large intestine, it preferably has sections similar in shape (and/or size) to a caecum and colon, respectively.

Item 6: Apparatus according to any one of items 1 to 5, wherein the vessel is provided with two openings at its ends in a longitudinal direction of the vessel, which have a function similar to a cardia and a pylorus of a human stomach. Through these openings which can be closed fluids and ingredients (food, drugs, etc.) can be fed into the vessel and discharged therefrom.

Item 7: Apparatus according to any one of items 1 to 6, wherein the vessel is provided with ridges at its inner wall, which predominantly extend in the longitudinal direction of the vessel. These ridges mimic e.g. the gastric rugae, and reinforce the interior of the vessel wall. Also, they provide predominant directions of wall deformation under load exerted by the constriction mechanisms. As a result, it is possible to achieve a pattern of wall deformation that is well reproducible. Preferably, the thickness of the ridges is approximately in the range of 2 to 4 mm.

Item 8: Apparatus according to item 7, wherein the ridges are made from a different material than the vessel, and are preferably made from a material that is stiffer than the material of the vessel. The ridges can also be made of the same material as the vessel, which allows the reduction of manufacturing costs.

Item 9: Apparatus according to any one of items 1 to 8, wherein the vessel is directly supported by the plurality of constriction mechanisms. That is, the weight of the vessel filled with fluid and contents is carried by the constriction mechanisms. Preferably, the constriction mechanisms are in direct contact with the vessel outer wall.

Item 10: Apparatus according to any one of items 1 to 9, wherein the constriction mechanisms are spaced apart from each other in a longitudinal direction of the vessel and are arranged along the longitudinal direction. Preferably, a space between the constriction mechanisms is as small as possible.

Item 11: Apparatus according to any one of items 1 to 10, wherein each of the constriction mechanisms is able to change its inner diameter in a predefined plane. As a result, a local and annular constriction of the vessel wall in a predefined plane can be achieved.

Item 12: Apparatus according to item 11, wherein the predefined plane is substantially perpendicular to the longitudinal direction of the vessel.

Item 13: Apparatus according to item 11 or 12, wherein at least some of the predefined planes cross each other. That is, since the concentric constrictions resulting in corresponding contractions of the vessel wall are carried out in different oblique planes, the motion present in a real human stomach/intestine can be simulated more precisely. Especially in case of the apparatus for simulating the human intestine (but also in the apparatus for simulating human stomach), the constrictions mechanisms can also be arranged coaxially in parallel planes.

Item 14: Apparatus according to any one of items 1 to 13, further comprising a controller which is configured to individually control the plurality of constriction mechanisms. That is, e.g. the time of operation of each constriction means and the amount of operation can be individually set. Preferably, the controller is a computer, more preferably a personal computer.

Item 15: Apparatus according to item 14, wherein the controller is configured to control the plurality of constriction mechanisms such that they change their inner diameters according to a predetermined pattern. With this configuration it is possible to generate a predetermined movement pattern of the vessel wall.

Item 16: Apparatus according to item 15, wherein the predetermined pattern is set such that the constriction mechanisms change their inner diameters in a synchronized manner so as to simulate a peristaltic movement of the human stomach and/or intestine. With the constrictions means changing their inner diameters such that resulting vessel wall contractions imitate a peristaltic movement (propulsive and/or non-propulsive peristalsis) of the human stomach and/or intestine, a highly realistic simulation of the function of human stomach and/or intestine is achieved. As a result, a highly precise simulation of the motion of gastric ingredients including food, drugs, etc. as well as realistic training simulator for endoscopic training is achieved.

Item 17: Apparatus according to item 15 or 16, wherein the predetermined pattern is set such that the inner diameter of a constriction mechanism located at an end of the vessel is kept at a minimum diameter so as to keep the end of the vessel closed. This simulates the function of cardia and pylorus, respectively.

Item 18: Apparatus according to any one of items 15 to 17, wherein the predetermined pattern defines, for each constriction mechanism, a minimum inner diameter, a maximum inner diameter, an amount of change of the inner diameter, and/or a temporal course of the change of the inner diameter. Preferably, each constriction mechanism is actuated such that the inner diameter thereof changes in an approximately sinus-like manner (waveform), and the constriction mechanism are actuated in sequence with a time delay with respect to each other (i.e. the waveforms are phase-shifted in the order of the constriction mechanisms along the vessel).

Item 19: Apparatus according to any one of items 15 to 18, wherein the predetermined pattern sets a minimum inner diameter, a maximum inner diameter, an amount of change of the inner diameter, and/or a temporal course of the change of the inner diameter differently for different constriction mechanisms.

With the configurations according to items 18 and 19, a plurality of different patterns can be set allowing the simulation of specific movement patterns of the human stomach and/or intestine.

Item 20: Apparatus according to any one of items 1 to 19, wherein each constriction mechanism is formed of an iris mechanism having a variable iris aperture through which the vessel extends. The use of an iris mechanism is a simple and, thus, cost efficient way to realize the constriction mechanism. Furthermore, the iris mechanism allows a precise and uniform setting of the iris aperture. The constriction mechanism is not limited to the iris mechanism. E.g. a device forming a loop (the inner dimension of which can be changed) around the vessel e.g. by means of a cable, wire, rope, belt, tap etc., a device including two half rings between which the vessel is arranged and which can be moved relatively to each other so as to change the inner dimension thereof, etc. can be used as constriction means.

Item 21: Apparatus according to item 20, wherein the iris mechanism comprises a worm gear for changing a diameter of the iris aperture. Preferably, the worm gear comprises a worm, teeth of which engage with gear teeth formed around an outer circumference of a rotating ring of the iris mechanism, thereby being able to actuate the iris mechanism. This configuration is a simple and cost-efficient way to precisely actuate the iris mechanisms.

The iris mechanism can also be operated differently than by means of the worm gear, e.g. by means of a spur gearing, a linear actuator, a linkage, etc.

Item 22: Apparatus according to item 21, wherein a rotational axis of a worm of the worm gear is perpendicular to a center axis of the iris aperture. This arrangement enables a very compact structure so that plural iris mechanisms can be positioned in close proximity.

Item 23: Apparatus according to item 21 or 22, wherein worm gears of adjacent iris mechanisms are arranged at opposite positions with respect to a line connecting the centers of the corresponding iris apertures. Also, this arrangement allows that adjacent iris mechanisms can be positioned in close proximity.

Item 24: Apparatus according to any one of items 20 to 23, wherein each iris mechanism is driven by an electric motor. This assures a very precise and fast adjustment of the iris aperture. Of course, when another mechanism than the iris mechanism is used as constriction means, this other mechanism can be driven by an electric motor.

Item 25: Apparatus according to item 24, wherein the worm gear is drivingly connected to the electric motor. Of course, when another means than the worm gear is used, this other means can be driven by an electric motor.

Item 26: Apparatus according to any one of items 20 to 25, wherein centers of the iris apertures lie on a predetermined curve and, preferably, the iris apertures lie in converging planes.

Item 27: Apparatus according to any one of items 1 to 26, further comprising a frame to which the constriction mechanisms are mounted in fixed and predetermined postures.

Item 28: Apparatus according to item 27, wherein the constriction mechanisms are mounted such that a constriction mechanism located at an end of the vessel is able to change its inner diameter in a plane which is substantially parallel to the direction of gravity, and such that subsequent constriction mechanisms, in their order along the longitudinal direction of the vessel, are able to change their diameter in planes which are the more inclined with respect to the plane which is substantially parallel to the direction of gravity, the more the planes are away from the plane which is substantially parallel to the direction of gravity.

Item 29: Apparatus according to any one of items 1 to 28, further comprising a two-axis gimbal mechanism for rotating the vessel and the plurality of constriction mechanisms with respect to two orthogonal axes (lying in a horizontal plane). This allows the simulation of hydrodynamic conditions in the vessel, similar to the ones in human intestine (human stomach). In this respect, the rotation angle around each of the two rotation axes is preferably in the range of +−30°. Preferably, the vessel and the plurality of constriction mechanisms are mounted on a plate which can be rotated about these two rotation axes. Further preferably, one rotation axis extends substantially in the longitudinal direction of the vessel, whereas the other one extends orthogonal thereto.

Item 30: Apparatus according to item 29, wherein the two-axis gimbal mechanism is driven by two electric motors.

Item 31: Apparatus according to item 29 or 30, wherein the two-axis gimbal mechanism is actuated in a synchronized manner with the constriction mechanisms so as to simulate the conditions in the human intestine (small intestine and/or large intestine).

Item 32: Apparatus according to any one of items 1 to 31, further comprising a chamber housing, the vessel and the plurality of constriction mechanisms, wherein the inside of the chamber can be controlled to a predetermined temperature. This allows to simulate the temperature conditions inside a human stomach and/or intestine.

The invention is described in detail below by means of preferred embodiments with respect to the attached drawings.

FIG. 1(a) is a schematic side view of a vessel used in an apparatus for simulating the function of a human stomach according to a first embodiment of the present invention.

Figure 6:
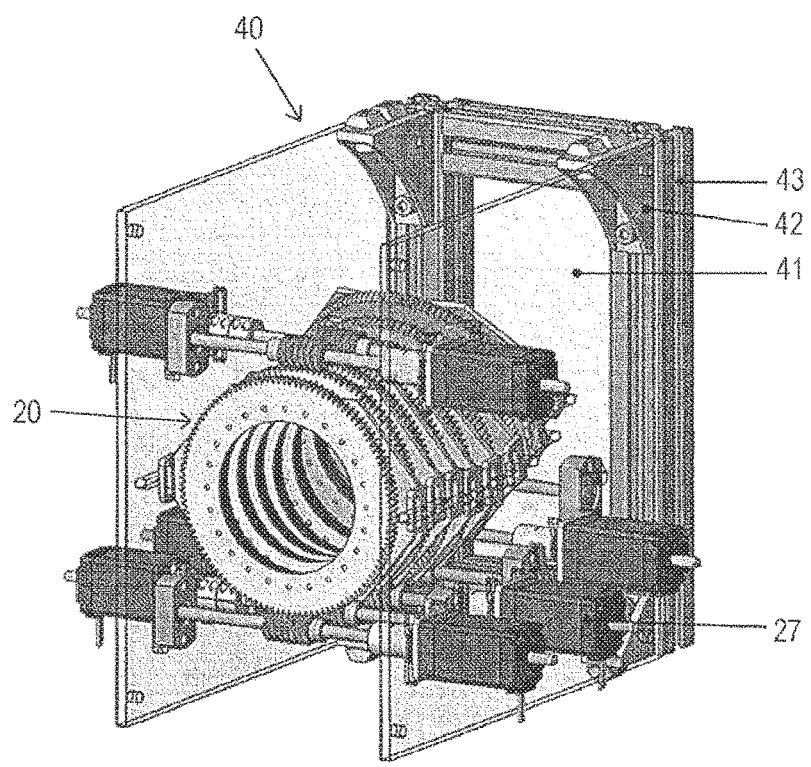

FIG. 6 schematically illustrates a part of the apparatus for simulating the function of a human stomach according to the first embodiment.

Figure 7:
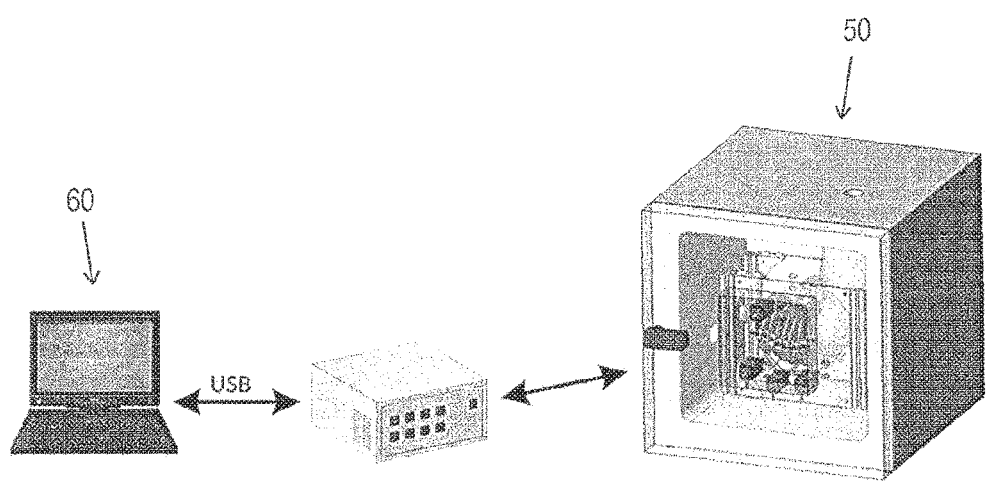

FIG. 7 schematically illustrates an example of a control system of the apparatus for simulating the function of a human stomach, with the apparatus being accommodated in a temperature-controlled chamber.

Figure 8:
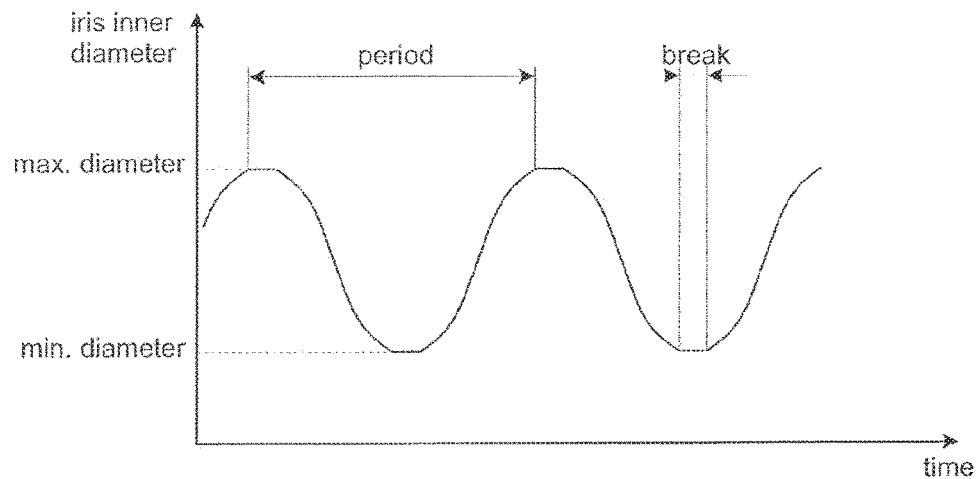

FIG. 8 shows an example of a temporal course of change of an iris inner diameter for the iris mechanisms of the apparatus for simulating the function of a human stomach according to the first embodiment.

Figure 9:
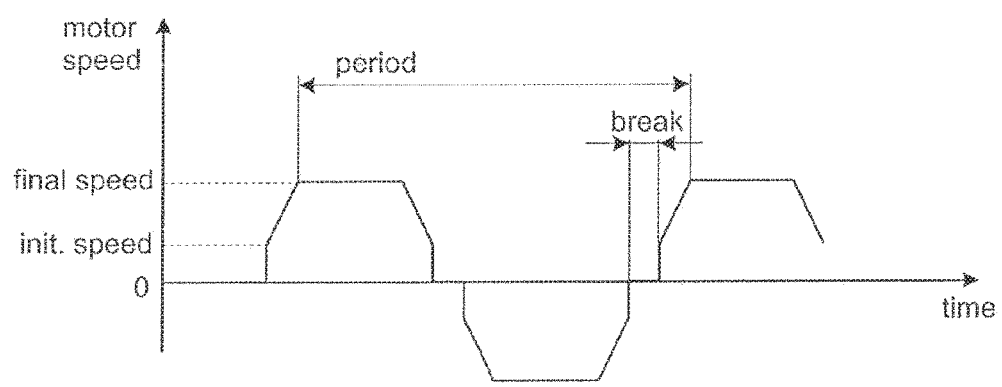

FIG. 9 shows an example of a speed profile for driving an electric motor of the iris mechanisms of the apparatus for simulating the function of a human stomach according to the first embodiment.

Figure 10:
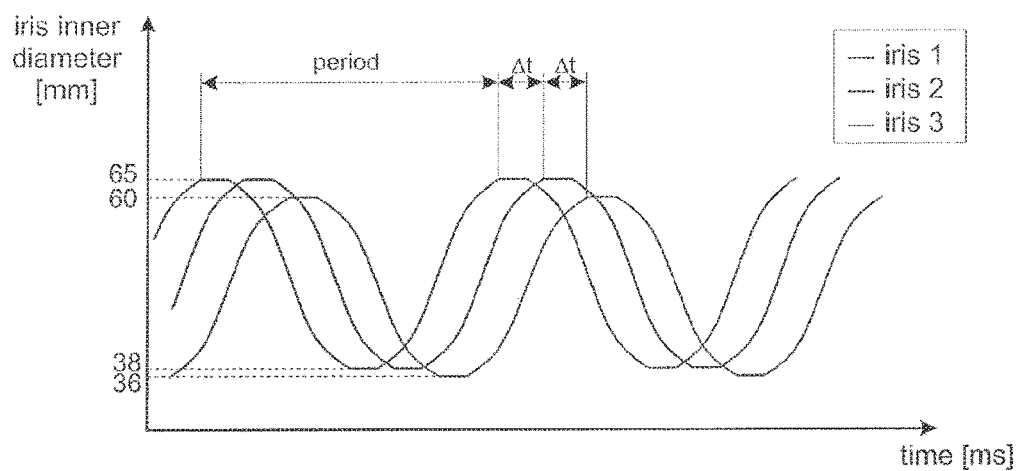

FIG. 10 shows an example of temporal courses of inner diameters of three adjacent iris mechanisms of the apparatus for simulating the function of a human stomach according to the first embodiment.

Figure 11:
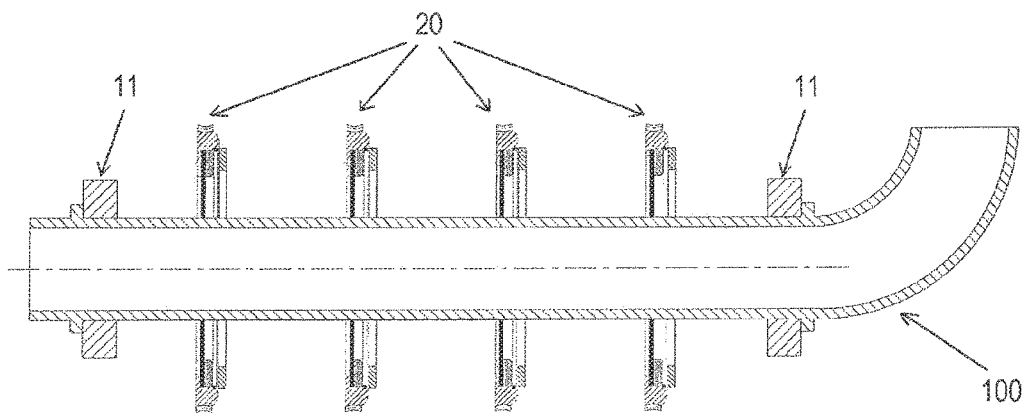

FIG. 11 is a schematic longitudinal section view of a vessel and a plurality of iris mechanisms of an apparatus for simulating the function of a human intestine according to a second embodiment of the invention.

Figure 12:
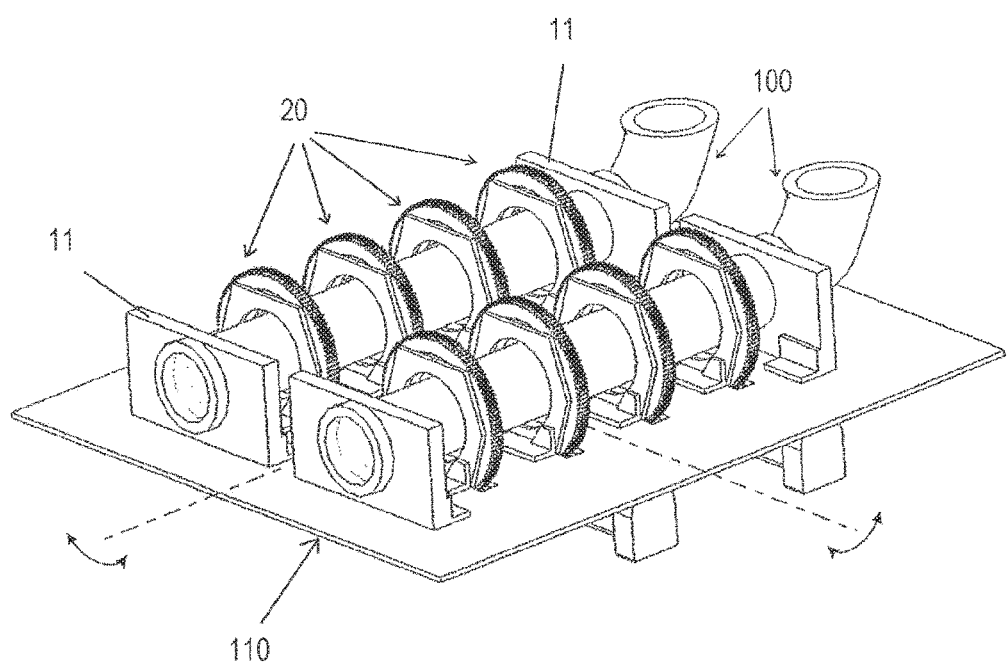

FIG. 12 is a schematic perspective view of the top side of a modification of the apparatus for simulating a human intestine according to the second embodiment of the invention.

Figure 13:
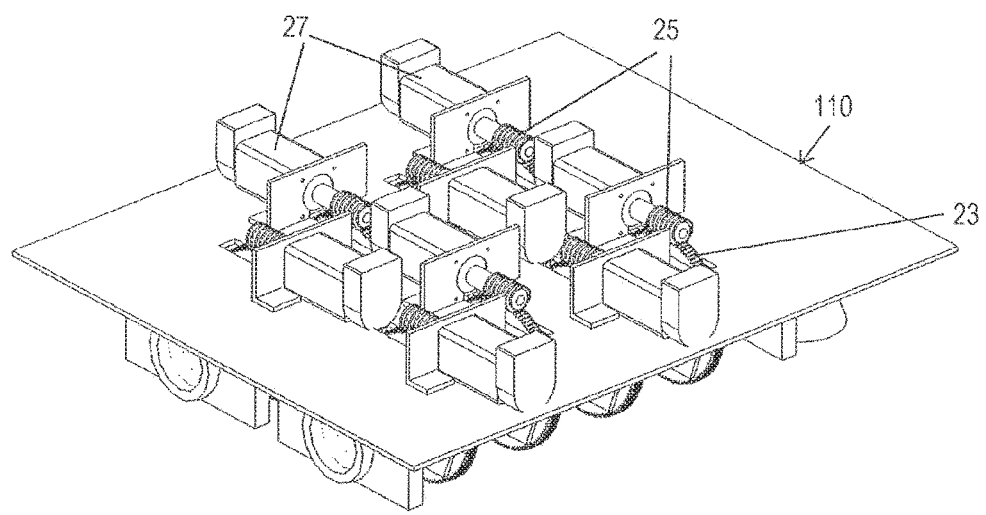

FIG. 13 is a schematic perspective view of the underside of the modification of the apparatus for simulating a human intestine, with electric motors driving iris mechanisms and a part of the iris mechanisms being visible.

Figure 14:
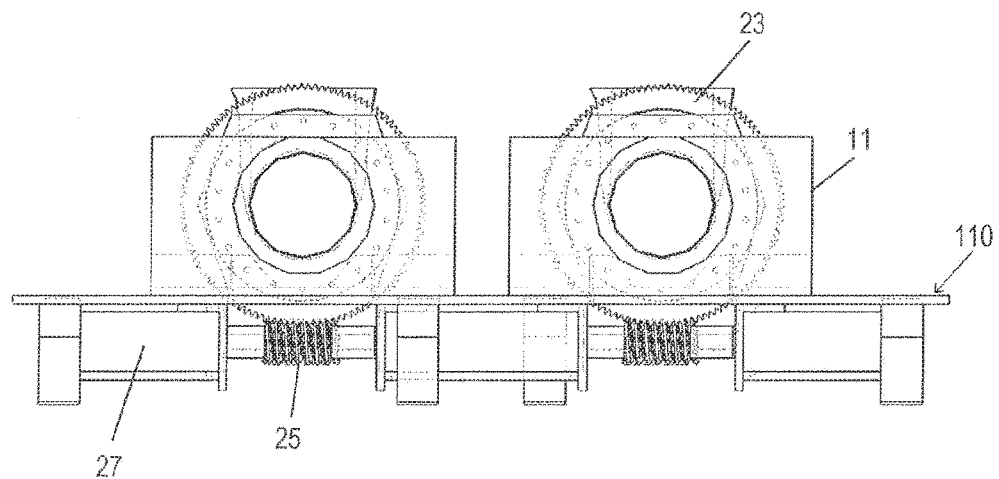

FIG. 14 is a schematic front view of the modification of the apparatus for simulating the human intestine.

Figure 15:
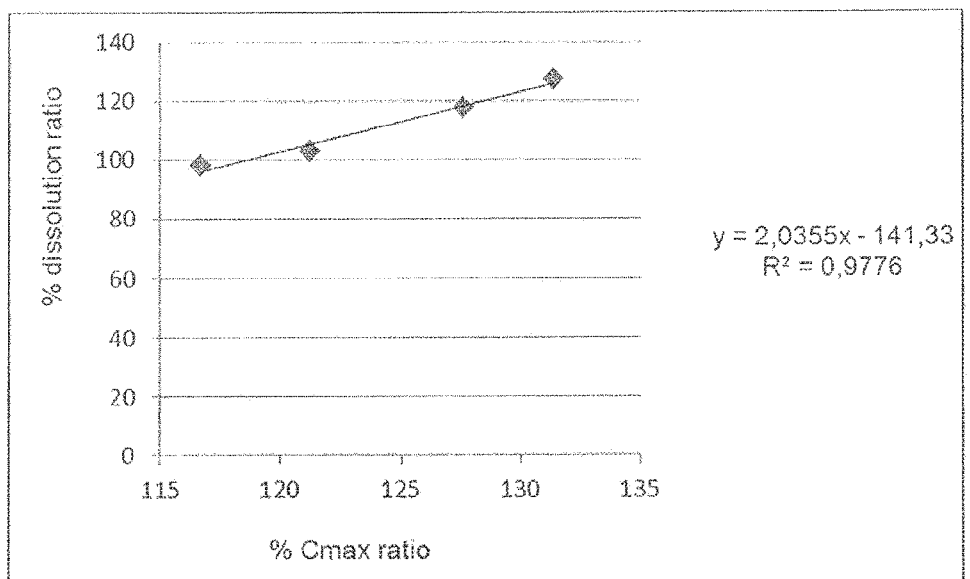

FIG. 15 shows a correlation between percentage dissolution ratio (test product/reference product) after 1 hour using the apparatus for simulating the function of a human stomach according to the first embodiment of the invention and Cmax ratio (test product/reference product) obtained from bioequivalence studies.

Figure 16:
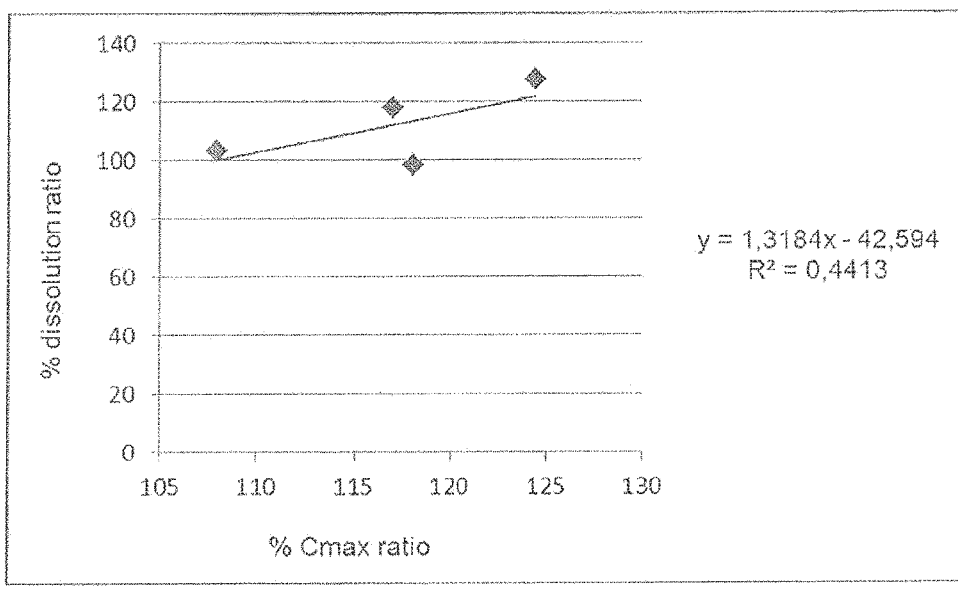

FIG. 16 shows a correlation between percentage dissolution ratio (test product/reference product) after 1 hour using a comparative apparatus at 75 rpm and Cmax ratio (test product/reference product) data obtained from bioequivalence studies.

Figure 17:
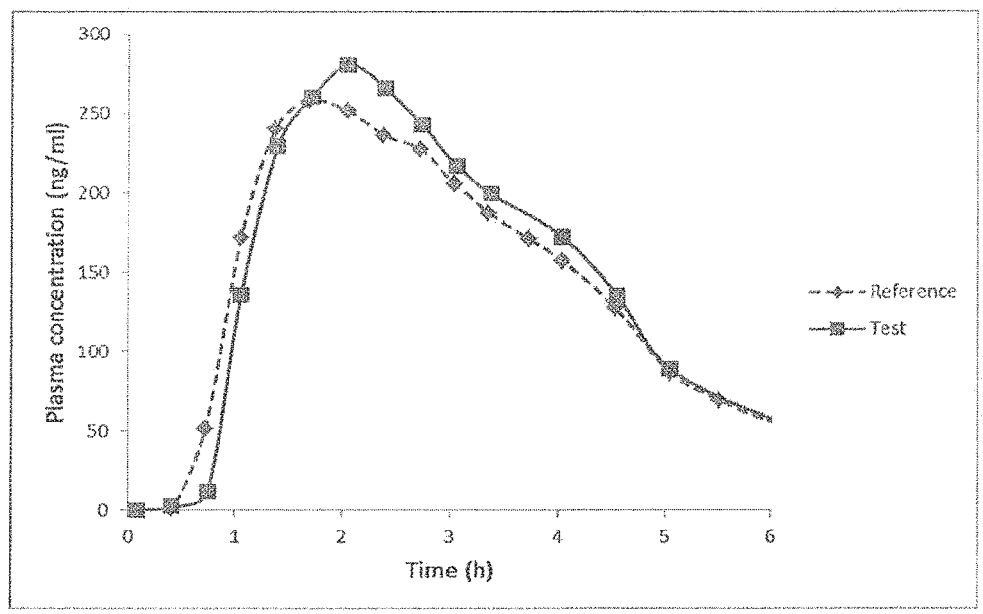

FIG. 17 shows an in vivo plasma profile (mean values) of test and reference product.

Figure 18:
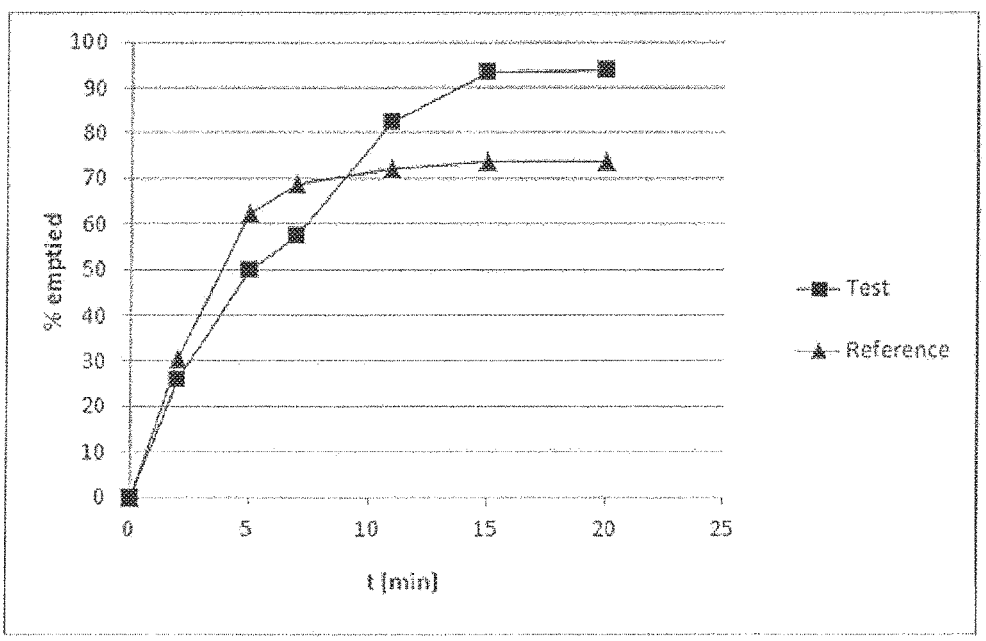

FIG. 18 shows the percentage of emptied pellets from the vessel of the apparatus for simulating the function of a human stomach according to the first embodiment with respect to time.

Figure 19:
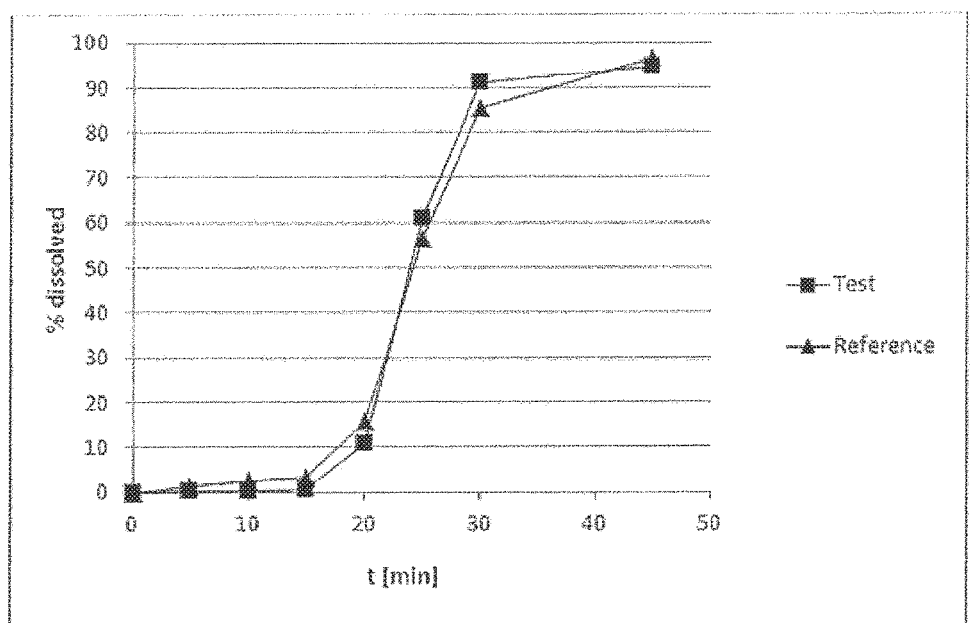

FIG. 19 shows the percentage of dissolved active substance with respect to time, obtained by using a comparative apparatus.

FIRST EMBODIMENT

As a first embodiment of the invention, an apparatus for simulating the function of a human stomach will be described with reference to FIGS. 1 to 10.

Figure 1B:
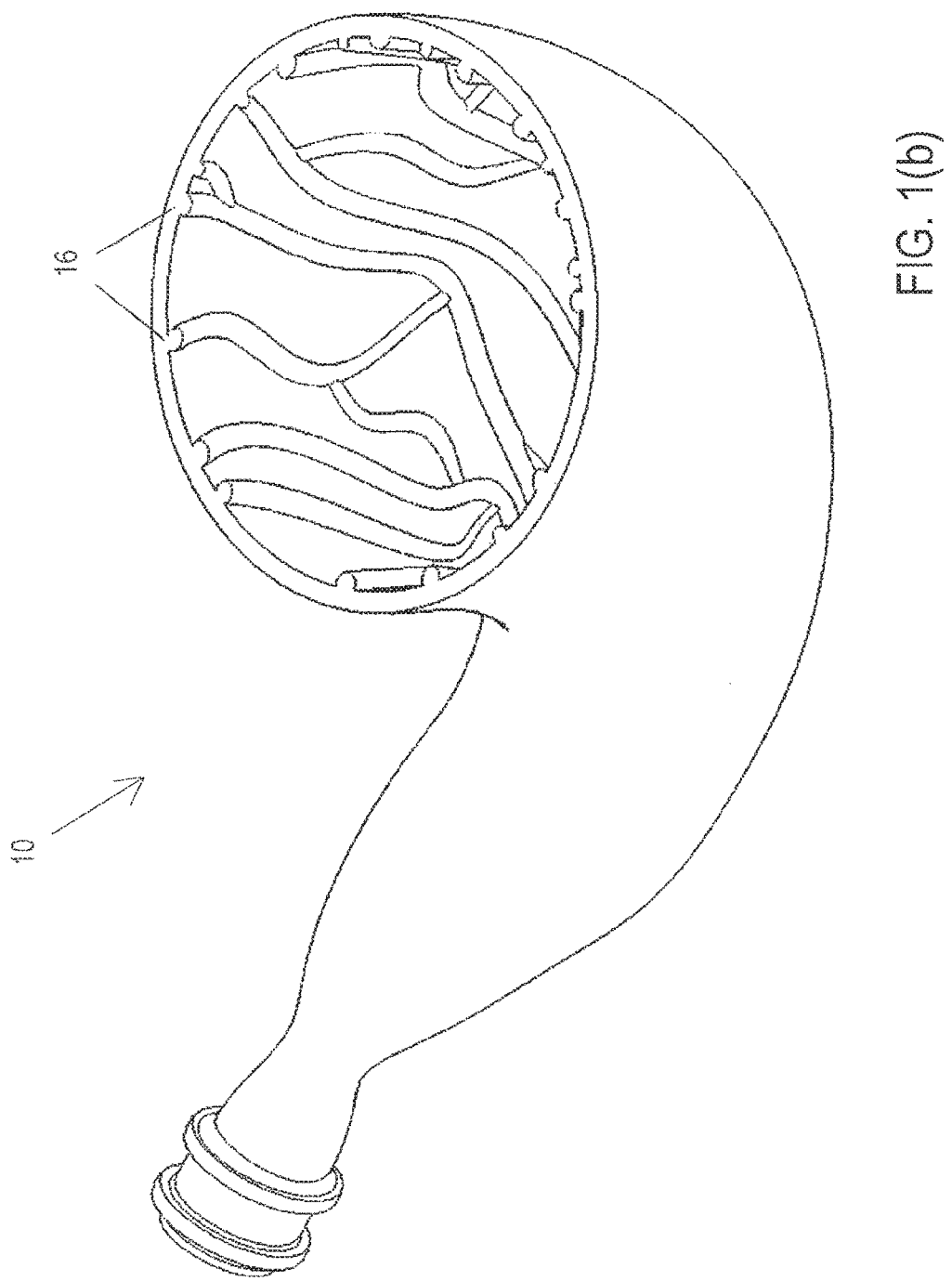
FIG. 1(b) is a schematic cross-section view of the vessel.
Figure 1C:
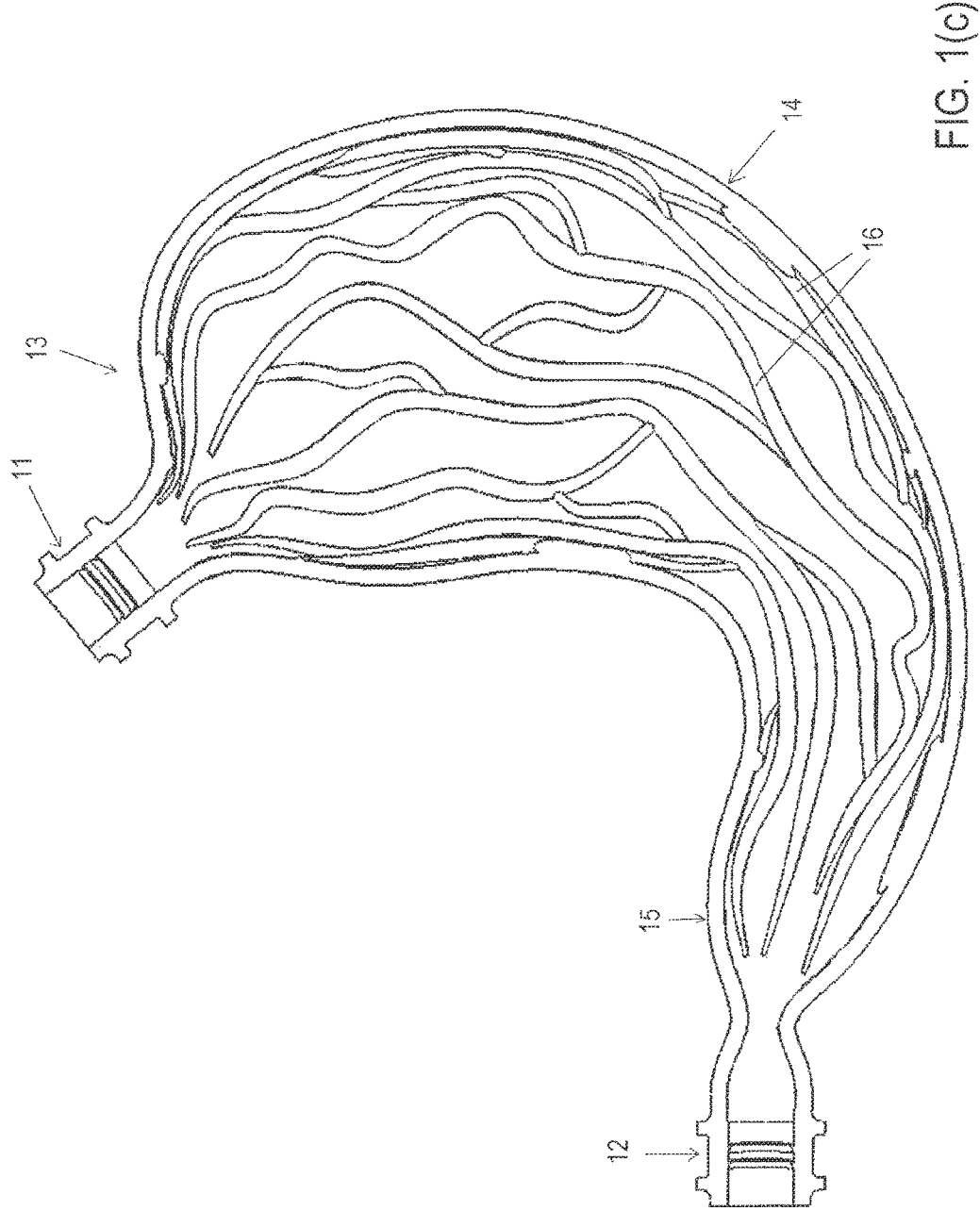
FIG. 1(c) is a schematic longitudinal-section view of the vessel.

Basically, the apparatus consists of the following major functional units:

A soft and flexible vessel 10 (illustrated e.g. in FIGS. 1(a) to 1(c)), simulating the stomach chamber, which accepts and stores the contents to be examined during an in-vitro test.

A plurality of iris mechanisms 20 (as e.g. illustrated in FIGS. 3 to 5) as constriction mechanisms, which are mounted along the vessel 10 in such a way that the vessel 10 goes through iris apertures A thereof. As the iris aperture of an iris mechanism 20 shrinks/closes, blades forming the iris aperture exert pressure on the vessel walls leading to a concentric local constriction (contraction) of the vessel.

A plurality of electric motors 30 (as e.g. illustrated in FIGS. 3 and 6) each driving a corresponding iris mechanism 20, and with each electric motor 30 being controlled by a dedicated embedded microcontroller. This drive/control system allows precise and repeatable execution of iris mechanism movements (that cause the contractions of the vessel 10) with programmable temporal profile and amplitude (minimum and maximum aperture opening).

A frame 40 (as e.g. illustrated in FIGS. 3 and 6), where the iris mechanisms 20 are mounted in fixed spatial relationships with the aim of executing programmed contractions of the vessel 10 in predefined planes.

An optional temperature controlled chamber 50 (as e.g. illustrated in FIG. 7) that houses the vessel 10 and the iris mechanisms 20 allowing an in-vitro test to be performed under specified temperature conditions (e.g. at 37° C. as in a real human stomach).

A controller or control system 60, which synchronizes operation of individual iris mechanisms 20 so that they produce synchronized patterns of vessel wall movements. This allows realistic simulation of various forms of peristaltic movements, such as antral contraction waves and other gastric motility patterns. In addition, the controller or control system 60 acts as the interface between the operator and the apparatus, through which the operator programs, monitors, starts and stops the test procedure.

Below, these functional units will be described in more detail.

(Vessel 10)

The vessel 10 which is shown in FIGS. 1(a) to 1(c) is made from a soft and flexible polymer with mechanical properties similar to those of the stomach tissue. That is, the vessel 10 will retain its shape when it is filled with fluid (as shown in FIG. 1(a) illustrating the vessel 10 when being filled with fluid). When empty, the vessel 10 will relax but not shrink significantly.

The shape and size of the filled vessel 10 closely resemble that of a filled adult human stomach. The vessel 10 has two openings: the inlet 11 at the top in FIG. 1(a) that acts as the cardia of a real human stomach, and the outlet 12 at the bottom left in FIG. 1(a) that acts as the pylorus. Other characteristic sections of a human stomach can be identified by examining the shape of the vessel 10:

fundus 13 (the curved section at the top near the inlet 11),
the body or corpus 14 (the central region), and
the (pyloric) antrum 15 (the lower section near the outlet 12 where mixing and grinding of the ingredients takes place).

The mechanical properties of the material and the thickness of the vessel wall are selected and balanced in order to achieve the desired functionality: flexibility, the desired behavior under load exerted by the iris mechanisms 20 (shape deformation, the ability to sustain and convey the required forces onto the ingredients), wear resistance and durability, good sealing at the outlet, etc. Further, the vessel exhibits chemical inertness in relation to acidic gastric fluid.

To this end, the vessel 10 is e.g. made from platinum cure silicon rubbers. The vessel 10 can be produced e.g. by employing up to three kinds of rubbers with different hardnesses. There can be multiple layers of rubber materials (with different mechanical properties). The thickness of the vessel material ranges preferably from 0.5 to 2 mm. Of course, it is also possible to produce the vessel 10 by using only one kind of rubber in one layer or more than three kinds of rubbers in a plurality of layers.

On the interior wall of the vessel 10 ridges 16 are formed as shown in FIGS. 1(b) and 1(c). The ridges 16 can also be made from platinum cure silicon rubber, and the approximate thickness of the ridges 16 preferably ranges from 2 to 4 mm. The vessel 10 including the ridges 16 can e.g. be manufactured by injection molding.

Figure 2:
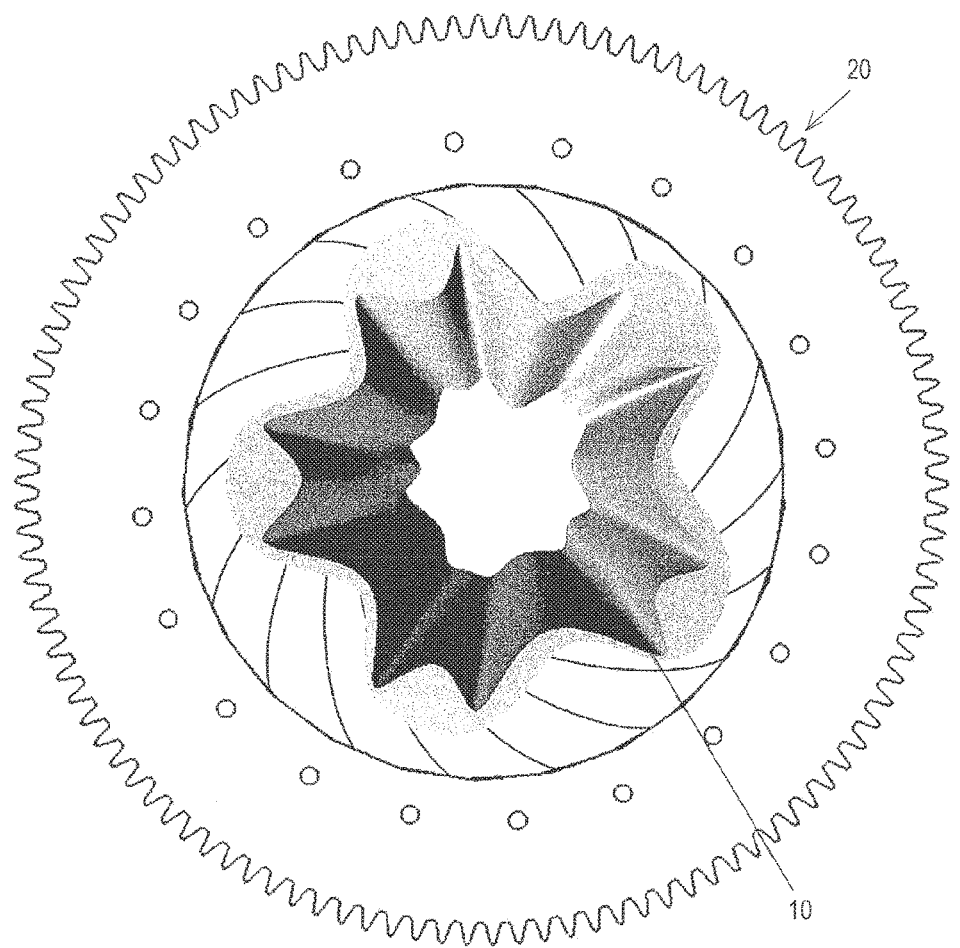
FIG. 2 shows a part of an iris mechanism and the vessel used in the apparatus for simulating the function of a human stomach according to the first embodiment of the present invention, wherein the vessel is deformed under a load exerted by the iris mechanism.

The ridges 16 run predominantly in the longitudinal direction of the vessel 10 and reinforce the vessel wall. In particular, the ridges 16 mimic the gastric rugae of a human stomach. They also serve as another function within the apparatus: they provide dominant directions of wall deformation under load exerted by the iris mechanisms 20. This enables achievement of patterns of wall deformation that are well reproducible and repeatable. In this respect, FIG. 2 shows the vessel 10 which is deformed under a load exerted by an iris mechanism 20, wherein the ridges 16 in the interior of the vessel determine the deformation pattern.

(Iris Mechanism 20)

Figure 3:
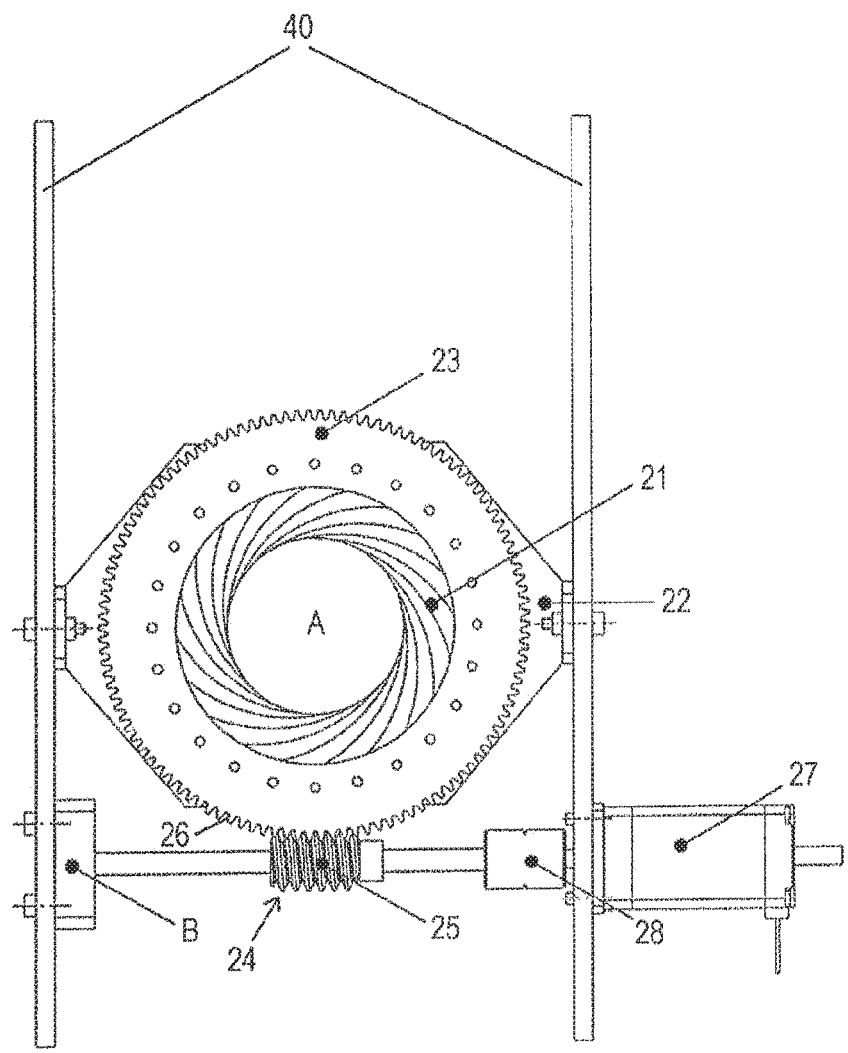
FIG. 3 shows, in front view, a schematic configuration of an iris mechanism used in the apparatus for simulating the function of a human stomach according to the first embodiment of the present invention.

The iris mechanism 20, as illustrated in FIG. 3, is similar to mechanisms employed in optical devices to modify the amount of transmitted light. The iris mechanism 20 consists of several blades 21 which are connected by means of revolute (hinged) joints on one side to a fixed iris body 22 (which is fixed to a frame 40) and on the other side to a rotating ring 23. By rotating the ring 23 relatively to the body 22 an iris aperture A (the iris inner diameter defined by the blades 21) can be increased or decreased, depending on the rotation direction. Further, the iris mechanism 20 comprises a worm gear 24 for rotating the ring 23. The worm gear 24 comprises a worm 25 which engages with gear teeth 26 formed around an outer circumference of the rotating ring 23 (in this embodiment the gear teeth are directly machined onto the rotating ring 23). At one end, the worm 25 is supported by a bearing B, and at its other end, the worm 25 is drivingly connected to an electric motor 27 via a coupling 28. Accordingly, a driving force of the electric motor 27 can be transmitted via the worm 25 to the rotating ring 23 so that the rotating ring 23 is rotated, thereby changing the diameter of the iris aperture A. Moreover, as shown in FIG. 3, the axis of the worm 25 is perpendicular to a center axis of the iris aperture A (lies in the plane of movement of the blades 21). This arrangement is vital to save space: several iris mechanisms 20 can thus be positioned in close proximity. The more iris mechanisms 20 are used in this apparatus the better approximation of the peristaltic movements can be achieved.

Figure 4:
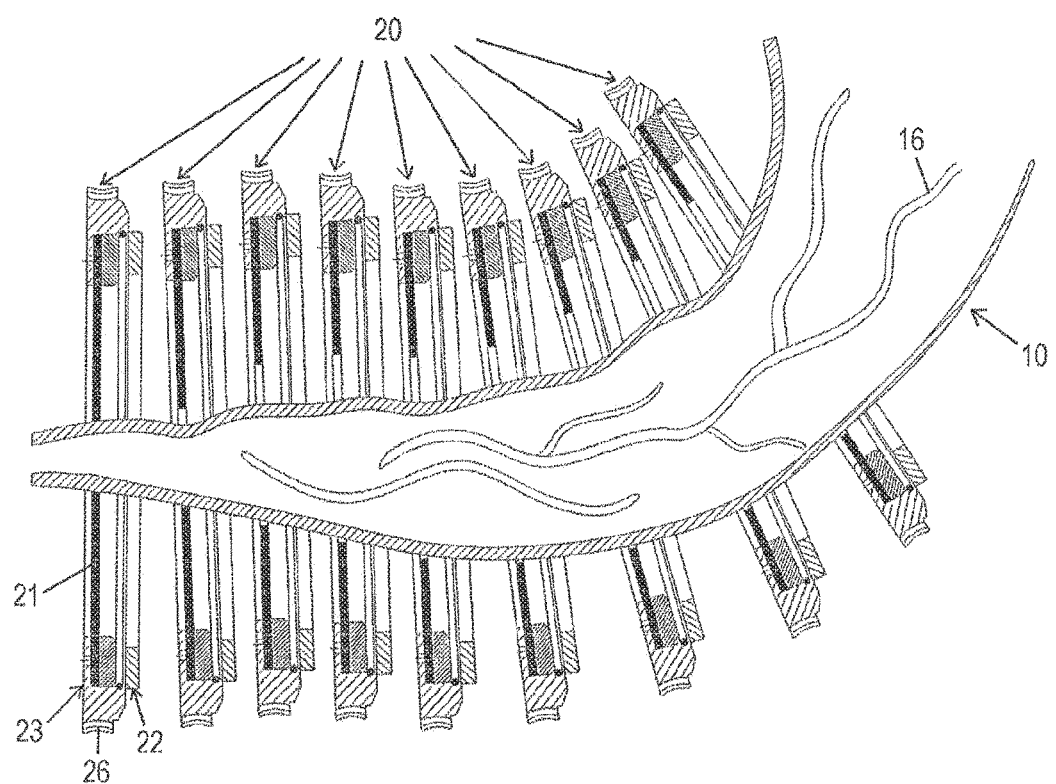
FIG. 4 is a schematic longitudinal section view of a part of the vessel and a plurality of iris mechanisms of the apparatus for simulating the function of a human stomach according to the first embodiment of the invention.

FIG. 4 is a schematic longitudinal section view of a part of the vessel 10 (in particular the antrum 15) and nine iris mechanisms 20 of the apparatus for simulating the function of a human stomach. This is a typical number of iris mechanisms 20 that can be assembled close to one another along a typical length of the antrum of an adult human stomach. The leftmost iris mechanism 20 in FIG. 4 acts as the pyloric sphincter which controls the flow of the ingredients out of the vessel 10.

The iris blades 21 exert only pressure, but no tension onto the vessel 10. They can compress the vessel 10 in the iris plane, but they can not expand (stretch) it. This fact is illustrated in FIG. 4 showing the empty vessel that does not completely fill the apertures of the irises but rather rests (due gravity) on the bottom of the iris blades 21.

Figure 5:
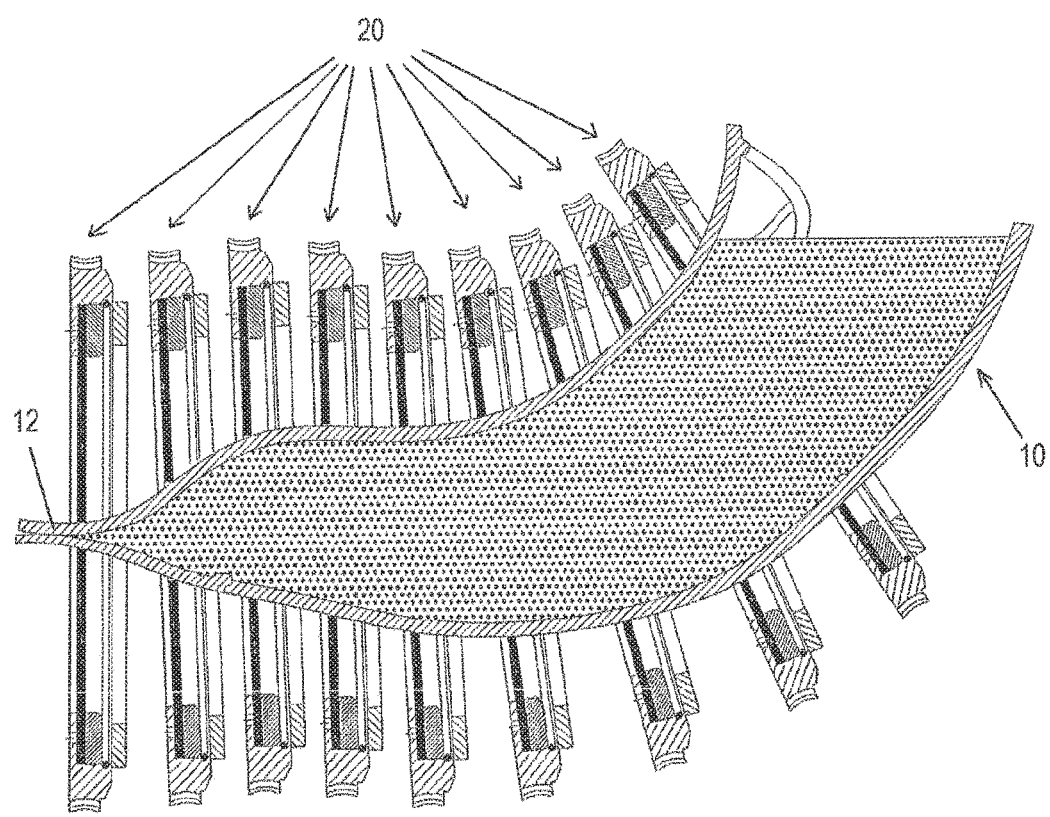
FIG. 5 is a schematic longitudinal section view of the vessel and the plurality of iris mechanisms, illustrated in FIG. 4, with the vessel being filled with liquid and the iris mechanisms exerting pressure onto the vessel.

In an initial position of the apparatus, when the vessel 10 is filled with fluid, the apertures A of the iris mechanisms 20 are opened to such an extent that they do not compress the vessel 10. Only the aperture A of the leftmost iris mechanism 20, as illustrated in FIG. 5, is closed to such an extent that the left end of the vessel (the outlet 12) is closed, thereby prohibiting leakage of fluid from the interior of the vessel 10.

(Frame 40)

FIG. 6 shows the frame 40 to which the iris mechanisms 20, as illustrated in FIG. 3, including worm gears and electric motors are mounted in fixed spatial relationships. In particular, in order to improve the similarity of the apparatus with a real human stomach which is typically curved (greater and lesser curvature) the iris mechanisms 20 are mounted in such a way that the centers of their apertures A lie on a curve and the apertures A lie in converging planes. Thus, the diameter of the apertures A can be changed in predefined planes, at least some of which cross each other. The frame 40 in this example is constituted by transparent acrylic holders 41, brackets 42 and aluminum profiles 43.

(Chamber 50)

In order to better simulate the conditions in a human stomach, a temperature-controlled chamber 50 can be optionally provided, as illustrated in FIG. 7. The frame 40 to which the iris mechanisms 20 including worm gears and electric motors are mounted, is placed into the chamber which is controlled to e.g. 37° C.

(Controller or Control System 60)

FIG. 7 further shows an example of a controller or control system 60 of the apparatus. In this example, the control system 60 consists of a personal computer connected via USB with actuator microcontrollers which actuate the iris mechanisms 20 which can be placed in the chamber 50. The pattern for actuating the iris mechanism runs on the computer as software program.

(Operation of the Apparatus for Simulating the Function of a Human Stomach According to the First Embodiment)

The operation of the apparatus is explained below with respect to the basic configuration of the apparatus as shown in FIG. 5. Here, the length of the vessel is approximately 250 mm, while its inner diameter varies from 65 mm to 25 mm. It is typically filled with 0.1 M HCl (depending on the type of experiment).

During operation of the apparatus, the iris mechanisms 20, except for the leftmost iris mechanism 20 which remains closed, are actuated (the diameter of the iris apertures A are changed) synchronously in such a way that at least one of them exerts pressure onto the vessel 10. Specifically, as the diameter of an iris aperture A is reduced, the vessel 10 is locally and annularly (corresponding to the inner circumference shape of the aperture) constricted (i.e. a local wall constriction takes place), thereby inducing a movement of the fluid. As the vessel 10 is flexible, the movement of fluid will cause the vessel 10 to deform and thus fill the apertures A of those iris mechanisms 20 the apertures A of which are open (without the apertures A compressing the vessel 10). FIG. 5 shows the vessel, filled with liquid, during a test cycle when the vessel completely fills the apertures A of the iris mechanisms 20. Thus, the vessel 10 will deform dynamically in a way allowed by the iris mechanisms 20, i.e. that depends on a pattern according to which the iris mechanisms 20 are actuated. This pattern of iris mechanism actuation can define a minimum inner diameter, a maximum inner diameter, an amount of change of the inner diameter, and a temporal course of the change of the inner diameter for each iris mechanism 20 and can also define the temporal order, according to which the individual iris mechanisms 20 are actuated. The pattern can be freely set (is fully programmable) in this apparatus, thus allowing realization of different vessel movements that resemble different stomach motility patterns (e.g. antral contraction waves, propulsive as well as non-propulsive peristalsis, etc.).

Traveling contraction waves (in particular traveling contractions that resemble antral contraction waves, traveling towards the pyloric sphincter), are generated by synchronized opening and closing of iris mechanisms 20.

In the following, a detailed description is given how the traveling contraction waves are simulated. Specifically, to simulate the contraction waves, the iris mechanisms 20 are actuated in a synchronous manner. With respect to the configuration shown in FIG. 5, the iris mechanisms are denoted with numbers from 1 to 9, where the number 1 represents the mechanism 20 that is the most distant from the leftmost iris mechanism in FIG. 5, simulating the pyloric sphincter. In the beginning of the simulation, the iris mechanism No. 9 (the leftmost iris mechanism 20 in FIG. 5, simulating the pyloric sphincter) is closed while the others are fully opened.

The temporal course of change of the iris inner diameter (opening of aperture A) for each of the iris mechanisms Nos. 1 to 8 is schematically shown in FIG. 8. That is each of the iris mechanisms Nos. 1 to 8 is actuated such that the iris inner diameter changes in an approximately sinus-like manner (waveform), between the minimum inner diameter and the maximum inner diameter (peak-to-peak amplitude). Besides, when reaching the maximum or minimum inner diameter, the opening of the iris is shortly held at this diameter, as indicated with "break" in FIG. 8.

The below table 1 shows an example of typical values of maximum and minimum inner diameters of the iris mechanisms Nos. 1 to 8.

TABLE 1

|  | Nos. of iris mechanism | | | | | | | |
|---|---|---|---|---|---|---|---|---|
|  | 1 | 2 | 3 | 4 | 5 | 6 | 7 | 8 |
| Minimum inner diam. [mm] | 38 | 38 | 36 | 32 | 27 | 25 | 20 | 12 |
| Maximum inner diam. [mm] | 65 | 65 | 60 | 55 | 50 | 45 | 40 | 22 |

Specifically, the temporal course shown in FIG. 1 is realized with a trapezoid speed profile of the electromotor 27 driving each individual iris mechanism 20, as shown in FIG. 9.

The temporal course is defined by the period, break, initial speed, final speed and acceleration. These parameters can be modified in order to achieve the desired motion pattern. Examples for typical values are the following:
Period: 8.200 ms
Break: 500 ms
Initial speed: 2.36 mm/s (speed of change in iris diameter)
Final speed: 10.6 mm/s (speed of change in iris diameter)
Acceleration: 5.5 mm/s2

The adjacent iris mechanisms Nos. 1 to 8 are actuated with a time delay ($\Delta t$) which defines the traveling velocity of the contraction waves. That is, the waveforms are phase-shifted in the order of the iris mechanisms Nos. 1 to 8. A typical example of a value of time delay ($\Delta t$) between two iris mechanisms is 1200 ms. FIG. 10 shows an example of temporal courses of inner diameters of three adjacent iris mechanisms (Iris mechanisms Nos. 1, 2 and 3).

Thus, the periodic temporal course of the iris inner diameter of each iris mechanism Nos. 1 to 8 can be represented by a $profile_i(t)$, where i represents the iris mechanism number (1 to 8 in this example). Each $profile_i(t)$ provides the desired change in iris inner diameter in the selected period. The $profile_i( )$ is fully defined by the period, break, initial speed, final speed and acceleration. In order to achieve the desired traveling contraction the iris inner diameters ($ID_i$) are actuated according to the following equation:

$$ID_i(t) = profile_i(t - (i-1)\Delta t)$$

where i represents the iris number.

SECOND EMBODIMENT

As a second embodiment of the invention, an apparatus for simulating the function of a human intestine (small or large intestine) will be described with reference to FIGS. 11 to 14.

The apparatus for simulating the function of human intestine follows the same principles of operation as the apparatus for simulating the function of human stomach, as described above. Therefore, below only the differences with respect to the apparatus for simulating the function of human stomach will be described.

As shown in FIG. 11, the apparatus for simulating the function human intestine basically comprises a vessel 100 and a plurality of iris mechanisms 20. The vessel 100 has a tubular shape, and its dimensions in this example are approximately as follows: outer diameter: 30-40 mm, length: 200-300 mm, thickness: 0.5-3 mm. The other configurations of the vessel 100, e.g. the material selected, can be such as in the first embodiment.

The iris mechanisms 20 are configured in the same manner as in the first embodiment, but they are placed coaxially in parallel planes, as illustrated in FIG. 11 (the iris mechanisms are fixed in this spatial relationship to a frame not shown). Further shown in FIG. 11 are additional mounts M (on the left and right side of the iris mechanisms) that are used to hold the vessel 100 in place during simulation, and that are preferably also mounted to the frame holding the iris mechanisms 20 in place.

The iris mechanisms 20 can be actuated in the same manner as the iris mechanisms 20 of the first embodiment, thereby inducing a peristaltic movement of the vessel 100.

FIGS. 12 to 14 illustrate a modification of the apparatus for simulating the human intestine. Specifically, two identical sets of iris mechanisms 20 which correspondingly receive two identical vessels 100 are mounted on a base plate 110, as shown in FIGS. 12 to 14. This configuration allows test and reference experiments to be carried out simultaneously.

In particular, the iris mechanisms 20 are mounted on the base plate 100 which can be rotated about two perpendicular axes, as indicated by arrows in FIG. 12. This can be achieved with a two-axis gimbal mount. The gimbal mount is driven by two electric motors (not shown) and is intended to induce hydrodynamic conditions similar to the ones in human intestine. Typical rotation angles for both axes are in a range of ±30° with 5 s period. The temporal course of change in iris inner diameter is (as in the case of apparatus for simulating the function of human stomach) defined by period, break, initial speed, final speed and acceleration. Typical temporal courses are similar to the ones illustrated in FIGS. 8 to 10. Further, the temporal order of actuation of the iris mechanisms 20 is described by the same equation as in the case of the apparatus for simulating the function of a human stomach.

EXAMPLES FOR USING THE APPARATUS ACCORDING TO THE FIRST EMBODIMENT

Below, specific examples for using the apparatus for simulating the function of a human stomach according to the first embodiment are described.

Example 1

HPMC based hydrophilic matrix tablets with different amount of controlled release polymer were tested in bioequivalence study for comparison with reference product. Tested active ingredient is BCS I compound meaning that absorption in gastrointestinal tract is dependent on release of substance from matrix tablet and is not limited with solubility or permeability of the substance.

Example 1a

In Example 1a test was performed with the apparatus according to the first embodiment in 3 parallels with following parameters: The vessel 10 was filled with 250 ml of degassed water temperate on 37° C., duration of test was set on 1 hour. Opening and closing of the 8 iris mechanisms 20 as illustrated in FIG. 5 is summarized in table 2 below. The diameter of an aperture A at the beginning of a test for each iris position is defined with "Starting position". Amplitude defines how much one iris mechanism closes during testing. Sequence defines time within one cycle of opening and closing is completed. Delay between opening and closing of iris mechanisms creates traveling contraction waves. This delay defines the differences in cycle of two following iris mechanisms.

TABLE 2

|  | Nos. of iris mechanism | | | | | | | |
|---|---|---|---|---|---|---|---|---|
|  | 1. | 2. | 3. | 4. | 5. | 6. | 7. | 8. |
| Starting position (mm) | 10 | 52 | 56 | 64 | 65 | 64 | 75 | 75 |
| Amplitude (mm) | 0 | 20 | 20 | 23 | 23 | 31 | 27 | 27 |

| Period | 8200 ms |
|---|---|
| Delay between opening and closing of iris mechanism | 15% |
| Ratio between movement and pausing of iris mechanism | 50% |

The vessel 10 used in this test was made up by six layers of silicone rubber, as listed in the below table 3.

TABLE 3

| layer | silicone | additional components |
|---|---|---|
| 1. | 40 g EcoFlex ® 00-10 | 0.8 g PlatCat + 2 drops ThiVex |
| 2. | 40 g EcoFlex ® 00-10 | 0.8 g PlatCat + 2 drops ThiVex |
| 3. | 40 g EcoFlex ® 00-10 | 0.8 g PlatCat + 2 drops ThiVex |
| 4. | 40 g Dragon Skin ® FX-Pro | 1 drop ThiVex |
| 5. | 30 g DragonSkin ® 20A | 2 drops ThiVex |
| 6. | 40 g Dragon Skin ® FX-Pro | — |

At the end of test, the vessel 10 was emptied and samples were taken. Samples were then filtered with PVDF Ø 25 mm pore size 0.45 µm; and analyzed with HPLC. Percent of released substance was calculated with the use of external standard. The result can be seen in FIG. 15.

Comparative Example 1a

In comparative example 1a conventional dissolution testing was performed. Dissolution testing parameters were 900 ml of phosphate buffer pH 6.8, comparative apparatus (commercially available), 75 rpm, at 37° C. For each set of tablets 12 parallels were tested. After one hour samples were withdrawn and filtered with PVDF Ø 25 mm pore size 0.45 µm. Amount of released substance was analyzed with HPLC with the use of external standard. The result is shown in FIG. 16.

As can be seen from a comparison between FIGS. 15 and 16, conventional dissolution methods fail to correlate samples according to their performance in vivo (correlation factor R2 is only 0.44), on the other hand correlation between in vitro and in vivo data obtained with the apparatus for simulating the function of a human stomach according to the present invention is much better (R2=0.98).

Example 2

Two products (test and reference), contained pellets with acid labile drug and coated with a gastro resistant polymer, were tested in bioequivalence study, performed on 96 healthy human volunteers. Concentration of the drug was measured in plasma at predefined time intervals. As shown from FIG. 17, administration of reference formulation resulted in higher plasma concentration of the drug up to 1.5 hours, but in lower concentrations afterwards.

Example 2a

Test was performed in 2 parallels for reference and 1 parallel for test product. Parameters were following: Vessel 10 was filled with 100 ml of degassed 0.1 M HCl with pepsine and sodium lauryl sulfate and temperate on 37° C., duration of test was set on 20 min. Parameters for opening and closing of the 8 iris mechanisms 20 as illustrated in FIG. 5 are summarized in Table 4 below. Definition of each parameter and composition of vessel 10 are already described in Example 1a above.

TABLE 4

|  | Nos. of iris mechanism | | | | | | | |
|---|---|---|---|---|---|---|---|---|
|  | 1. | 2. | 3. | 4. | 5. | 6. | 7. | 8. |
| Starting position (mm) | 22 | 40 | 45 | 50 | 55 | 60 | 65 | 65 |
| Amplitude (mm) | 10 | 20 | 20 | 23 | 23 | 24 | 27 | 27 |

| Period | 8200 ms |
|---|---|
| Delay between opening and closing of iris mechanism | 15% |
| Ratio between movement and pausing of iris mechanism | 50% |

During the test, the number of emptied pellets was counted and at the end the vessel 10 was emptied and remaining pellets in the vessel 10 counted. Percent of emptied pellets was calculated (FIG. 18). The active substance is BCS I compound and pharmaceutical form is gastro resistant (insoluble in gastric acid), which means that when the pellet is emptied from the stomach into the intestinal tract, gastro resistant coating is dissolved and the active substance is absorbed. As shown in FIG. 18, reference pellets are emptied from the vessel 10 at earlier time points faster compared to the test pellets, but slower afterwards. This perfectly correlates with observed plasma concentrations (FIG. 17).

Comparative Example 2a

Conventional dissolution testing was performed. Dissolution was started in 900 ml of 0.1 M HCl and for 45 min continued in carbonate buffer pH 6.0, comparative apparatus with peak vessels, 100 rpm, at 37° C. For each sample 3 replicates were made. Samples were withdrawn according to the defined time table (5, 10, 15, 20, 25, 30 and 45 min) and filtered with flow-through filter Erweka pore size 4.0 μm. Amount of released substance was analyzed on line with UV spectroscopy and use of external standard. Results are presented in FIG. 19.

As shown from FIG. 19, dissolution profiles of test and reference are very similar and do not correlate with in vivo data presented in FIG. 17.

As can be seen from the above, conventional dissolution method failed to correlate test and reference product according to their performance in vivo. On the other hand, results obtained with the apparatus for simulating the function of a human stomach according to the invention are in good agreement with in vivo data.

It seems that different patterns of gastric emptying of test and reference pellets are responsible for different plasma concentrations of the active substance. The apparatus for simulating the function of a human stomach can detect this difference, because it closely mimics the movement of the human stomach. On the other hand, conventional dissolution cannot detect this difference.

Emptying of pellets from the stomach is strongly dependent on the motion of the stomach, shape and/or position/orientation, dimensions and mechanical properties of the walls. The presented apparatus is the only one that closely follows the geometry of a real human stomach in terms of shape, orientation, dimensions and motion of a real stomach, which was demonstrated with Example 2, so that the apparatus can realistically simulate emptying of the pellets from the human stomach.

The invention claimed is:

1. Apparatus for simulating the function of a human stomach and/or intestine, comprising
a flexible vessel, and
a plurality of constriction mechanisms, wherein
each of the constriction mechanisms is disposed annularly around the outer circumference of the vessel, and
an inner diameter of each of the constriction mechanisms is variable such that the vessel can be locally and annularly constricted,
wherein each constriction mechanism is formed of an iris mechanism having a variable iris aperture through which the vessel extends and
wherein the iris mechanism comprises blades which are connected by revolute joints on one side to a fixed iris body and on the other side to a rotating ring.

2. Apparatus according to claim 1, wherein the vessel is made of a soft and flexible material.

3. Apparatus according to claim 1, wherein a longitudinal direction of the vessel describes a curve.

4. Apparatus according to claim 1, wherein the vessel has a shape similar to that of a human stomach, and/or similar to that of human small intestine, and/or similar to that of human large intestine.

5. Apparatus according to claim 1, wherein the vessel is provided with ridges at its inner wall, which predominantly extend in the longitudinal direction of the vessel.

6. Apparatus according to claim 1, wherein the constriction mechanisms are spaced apart from each other in a longitudinal direction of the vessel and are arranged along the longitudinal direction.

7. Apparatus according to claim 1, wherein each of the constriction mechanisms is able to change its inner diameter in a predefined plane.

8. Apparatus according to claim 1, further comprising a controller which is configured to individually control the plurality of constriction mechanisms such that they change their inner diameters according to a predetermined pattern.

9. Apparatus according to claim 8, wherein the predetermined pattern is set such that the constriction mechanisms change their inner diameters in a synchronized manner so as to simulate a peristaltic movement of the human stomach or intestine.

10. Apparatus according to claim 8, wherein the predetermined pattern defines for each constriction mechanism a minimum inner diameter, a maximum inner diameter, an amount of change of the inner diameter, and/or a temporal course of the change of the inner diameter.

11. Apparatus according to claim 1, wherein centers of the iris apertures lie on a predetermined curve.

12. Apparatus according to claim 1, further comprising a two-axis gimbal mechanism for rotating the vessel and the plurality of constriction mechanisms with respect to two orthogonal axes lying in a horizontal plane.

13. Apparatus according to claim 12, wherein the two-axis gimbal mechanism is actuated in a synchronized manner with the constriction mechanisms so as to simulate the conditions in the human intestines.

14. Apparatus according to claim 1, further comprising a chamber housing the vessel and the plurality of constriction mechanisms, wherein the inside of the chamber can be controlled to a predetermined temperature.

* * * * *